United States Patent [19]
Sato

[11] 3,885,657
[45] May 27, 1975

[54] FRICTION CLUTCH

[76] Inventor: Hisaharu Sato, Seiei-So, No. 50-16 Tsukakoshi, Warabi, Saitama Prefecture, Japan

[22] Filed: Sept. 28, 1973

[21] Appl. No.: 401,899

[52] U.S. Cl................ 192/79; 64/11 R; 64/13; 74/574; 192/85 AT; 192/106.1; 192/113 B
[51] Int. Cl.................... F16d 13/10; F16d 3/76
[58] Field of Search......... 192/55, 79, 88 B, 85 AT, 192/106.1, 70.17, 113 A:113 B; 64/11 R, 13, 64/27 NM; 74/574; 188/1 B

[56] References Cited
UNITED STATES PATENTS

| | | | |
|---|---|---|---|
| 2,141,645 | 12/1938 | Fawick | 192/55 X |
| 2,340,315 | 2/1944 | Fawick | 192/85 AT |
| 2,873,010 | 2/1959 | Alma | 192/88 B |
| 2,944,844 | 7/1960 | Miller | 64/13 |
| 2,991,851 | 7/1961 | Alden | 192/113 B X |
| 3,245,229 | 4/1966 | Fadler | 64/11 R X |
| 3,283,534 | 11/1966 | Reich | 64/11 R |
| 3,500,972 | 3/1970 | Talmage | 192/113 A X |
| 3,719,060 | 3/1973 | Fessel et al. | 64/11 R |

FOREIGN PATENTS OR APPLICATIONS

| | | | |
|---|---|---|---|
| 467,708 | 4/1914 | France | 192/113 A |

*Primary Examiner*—Allan D. Herrmann
*Attorney, Agent, or Firm*—Hans Berman

[57] ABSTRACT

The drum element in a drum-type clutch is fastened to the input shaft of the clutch by means of a torque transmitting rubber ring interposed between the shaft and the inner face of a circumferential drum wall. The outer face of the drum wall may be engaged by friction shoes mounted on the output shaft, and the rubber ring is protected against premature deterioration by frictionally generated heat by a cavity which extends in the circumferential wall over the drum circumference between the inner and outer faces, and may be filled with air, with thermally insulating material, or with a circulating cooling fluid.

6 Claims, 1 Drawing Figure

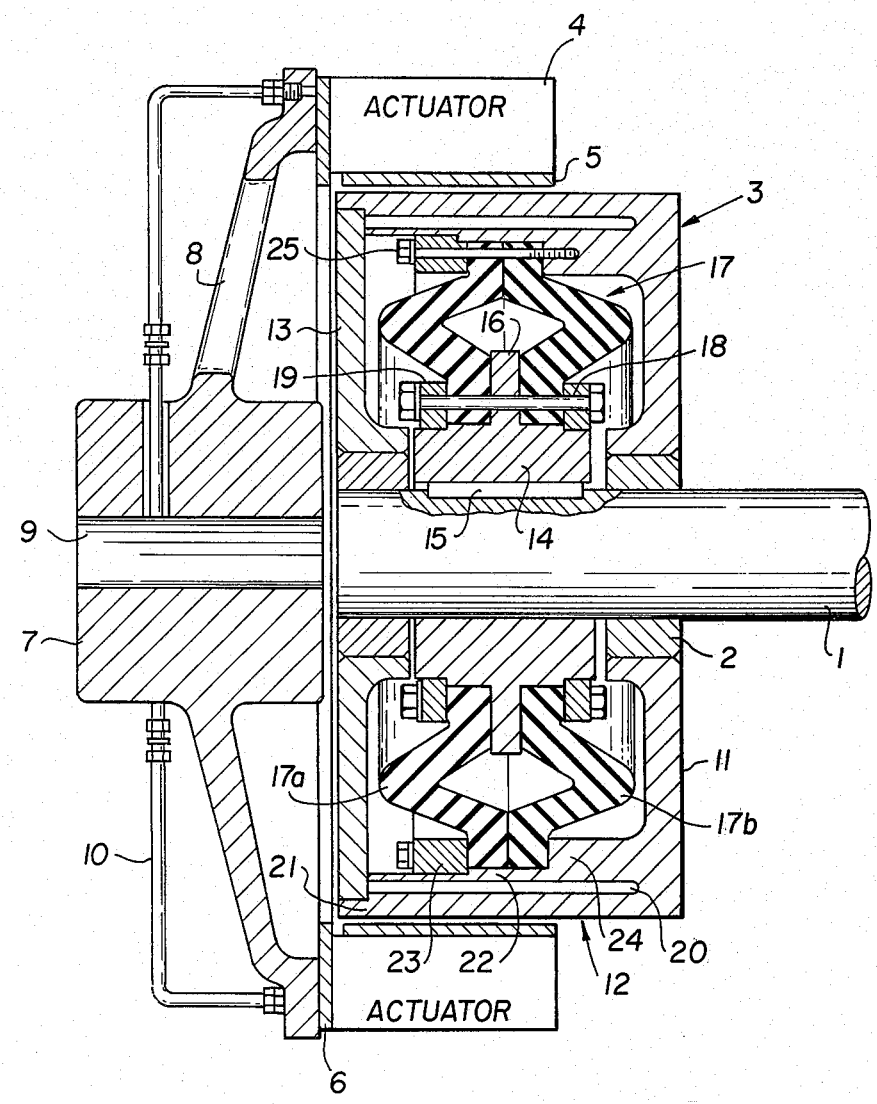

FRICTION CLUTCH

This invention relates to friction clutches, and particularly to an improvement in the pneumatically operated drum-type clutch disclosed in Sugahara U.S. Pat. No. 3,618,726.

While the clutch of the patent has been used successfully in many applications, it has been found to require great care in assembly with associated elements of a power train, such as the output shaft of an engine and the input shaft of a transmission. Particularly when the shaft temperature changes during operation or when the foundation of the drive arrangement including the clutch is deformed, as may happen in marine installations due to the relatively great flexibility of a ship's hull, vibration of the clutch output shaft may occur and not be capable of being prevented by the shaft bearings if the mountings of the latter are not perfectly rigid.

An important object of this invention is the provision of an improved clutch of the type disclosed in the afore-mentioned patent which is not unfavorably affected in its operation by vibration in its input or output shaft, and impedes propagation of such vibration.

For this purpose, the invention provides a ring of elastomeric material radially interposed between the circumferential wall of the clutch drum, respective radial portions of the ring being fixedly fastened to the circumferential drum wall and to an associated shaft. To prevent premature thermal deterioration of the ring material, a cavity extending about the drum axis in an arc of at least 180°, or a plurality of cavities jointly extending to such an arc, separate the inner portion of the drum wall, attached to the ring, from the outer portion whose engagement face is engaged by friction shoes when the clutch transmits torque.

Other features, additional objects, and many of the attendant advantages of this invention will readily be appreciated as the same becomes better understood by reference to the following detailed description of a preferred embodiment when considered in connection with the appended drawing in which the sole FIGURE shows a clutch of the invention in axial section, and partly in simplified outline.

Only the output shaft 1 of an engine is seen in the drawing and constitutes the input member of the clutch. Two axially spaced bearing rings 2 on the shaft 1 rotatably support a hollow drum 3 having the shape of a short cylinder about the axis of the shaft 1. An annular actuator arrangement 4 carries a plurality of circumferentially distributed friction shoes 5 and moves the shoes into torque transmitting engagement with the outer, cylindrically convex face of the drum 3 when air under pressure enters the actuator arrangement 4 which is mounted on a flat annular disc 6.

The disc 6 is fixedly fastened on the clutch output shaft 7, coaxial with the input shaft 1, by means of a spider 8, integral with the shaft 7. Operating air may be supplied to the actuator arrangement 4 through an axial bore 9 of the shaft 7 and distributor lines 10 respectively associated with the friction shoes 5. The actuator arrangement 4 is not capable of clear pictorial representation on the scale of the instant drawing. It is identical with the corresponding actuating mechanism disclosed in the afore-mentioned patent.

The drum 3 has one radial wall 11 which is integral with the outer circumferential wall 12, and the second radial wall is constituted by a flat cover 13 releasably fastened to the circumferential wall 12 in a conventional manner, not shown, and supported on one of the bearing rings 2. A sleeve 14 is secured to the shaft 1 between the bearing rings 2 by a key 15 and carries an integral radial flange 16 projecting into the cavity of the drum 3.

The radially inner rims of the two symmetrical halves 17a, 17b of an axially split, heavy, tubular rubber ring 17 are fastened to respective radial faces of the flange 16 by circumferentially distributed tie rods 18 and two clamping rings 19.

The outer circumferential drum wall 12 is formed with a cylindrical slot 20 which is closed in one axial direction and sealed in the other axial direction by the cover 13. The slot is axially approximately coextensive with the cavity of the drum 3 and separates the radially outer, annular portion 21 of the wall 12 from an annular portion 22 offset from the portion 21 in a radially inward direction. The radially outer rims of the ring halves 17a, 17b are jointly fastened to the drum wall 12 between a clamping ring 23 and a shoulder 24 of the wall portion 22 by bolts 25.

When compressed air is admitted to the actuator arrangement 4 through a non-illustrated control valve, the shoes 5 are moved radially inward toward the outer, cylindrical engagement face of the drum 3 on the wall portion 21. Both during engagement and during disengagement of the clutch, there is a short period during which the friction shoes slip on the drum surface, and heat is generated by the relative movement of the shoes 5 and the engaged drum wall 12. The slot 20 prevents much of the thermal energy from reaching the tube 17. The cover 13 and the radial drum wall 11 function as heat sinks and also dissipate the thermal energy to the ambient atmosphere before the temperature of the ring 17 can be raised significantly. The radial walls 11, 13 also indirectly cool the friction shoes 5 and extend their useful life.

The ring 17 resiliently couples the drum 3 to the shaft 1. It damps starting and stopping shock, compensates for minor misalignment between the two shafts 1, 7 within the limits set by clearances at the bearing rings 2 (not shown), and prevents oscillation to be transmitted through the drive train. The ring 17 being mounted within the drum 3 does not require significant space beyond that needed to accommodate the shoes 5 and the cooperating engagement face of the wall 12.

In the illustrated embodiment of the invention, the slot 20 extends in a full circle about the clutch axis, and such an arrangement is most effective for thermal insulation of the wall portions 21, 22 from each other. Such insulation may be further enhanced by filling the slot 20 with loose glass wool or other thermally insulating material which interferes with air circulation within the slot 20. Alternatively, cooling liquid may be pumped through the slot through a feeding and discharge system suitably adapted from the illustrated pneumatic system for the actuator arrangement 4.

If considerations of structural strength so require, the single slot 20 may be replaced by a plurality of cavities separated circumferentially by integral partitions radially connecting the wall portions 21, 22. Significant protection of the rubber ring 17 is achieved when the slot 20 or the separated cavities extend about the clutch axis in a total or combined arc of at least 180°.

A ring 17 split into axial halves 17a, 17b is preferred at this time, but it will be apparent from the illustrated cross section of the ring that it may be a unitary element similar to a conventional automobile tire. The illustrated ring 17 forms a circumferentially closed tube with the flange 16, but the use of a unitary ring whose rubber walls alone form a closed tube is contemplated. The inner radial portion of the ring may then be fastened to the shaft 1 in the manner illustrated for the radially outer rims of the halves 17a, 17b.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. In a clutch having an input member and an output member mounted for rotation relative to each other about a common axis, a drum element connected to one of said members for joint rotation and having an engagement face of circular cross section about said common axis, a plurality of friction shoes mounted on the other member in circumferentially spaced relationship, and actuating means for moving said friction shoes into motion transmitting frictional engagement with said engagement face, the improvement which comprises:
   a. said drum element including a circumferential wall having two annular portions offset radially relative to said common axis,
      1. one of said portions carrying said engagement face,
      2. the other portion being radially spaced from said one member,
      3. the two portions of said circumferential wall defining therebetween at least one cavity extending about said common axis in an arc of at least 180°; and
   b. a ring of elastomeric material radially interposed between said other portion of said circumferential wall and said one member, respective radial portions of said ring being fixedly fastened to said one member and to said other portion of said circumferential wall for transmitting torque between said drum element and said one member, said at least one cavity impeding the transmission of the heat generated by frictional engagement of said shoes with said engagement face to said ring.

2. In a clutch as set forth in claim 1, wherein said engagement face is convex, and said one portion of said circumferential wall is offset from said other portion in a radially outward direction.

3. In a clutch as set forth in claim 2, said drum element being hollow and enclosing said ring.

4. In a clutch as set forth in claim 3, said at least one cavity defined by said two portions being sealed in both axial direction.

5. In a clutch as set forth in claim 1, said ring being tubular.

6. In a clutch as set forth in claim 5, said ring being split in a plane radial to said axis into two axial parts, fastening means fastening inner and outer radial portions of the two axial parts to said one member and to said other portion of said circumferential wall.

* * * * *